(12) United States Patent
Shamir et al.

(10) Patent No.: US 9,837,069 B2
(45) Date of Patent: Dec. 5, 2017

(54) TECHNOLOGIES FOR END-OF-SENTENCE DETECTION USING SYNTACTIC COHERENCE

(71) Applicant: Intel Corporation, Santa Clara, CA (US)

(72) Inventors: Oren Shamir, Jerusalem (IL); Oren Pereg, Amikam (IL); Moshe Wasserblat, Maccabim (IL); Jonathan Mamou, Jerusalem (IL); Michel Assayag, Shoham (IL)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 14/979,142

(22) Filed: Dec. 22, 2015

(65) Prior Publication Data

US 2017/0178623 A1    Jun. 22, 2017

(51) Int. Cl.
| | |
|---|---|
| *G10L 15/04* | (2013.01) |
| *G10L 15/187* | (2013.01) |
| *G10L 15/18* | (2013.01) |
| *G10L 25/87* | (2013.01) |
| *G10L 25/39* | (2013.01) |

(52) U.S. Cl.
CPC ............ *G10L 15/04* (2013.01); *G10L 15/187* (2013.01); *G10L 15/1822* (2013.01); *G10L 25/39* (2013.01); *G10L 25/87* (2013.01)

(58) Field of Classification Search
None
See application file for complete search history.

(56) References Cited

U.S. PATENT DOCUMENTS

| | | | | |
|---|---|---|---|---|
| 4,624,008 A | * | 11/1986 | Vensko | G10L 15/12 704/241 |
| 5,001,633 A | * | 3/1991 | Fukumochi | G06F 17/271 704/6 |
| 5,457,768 A | * | 10/1995 | Tsuboi | G10L 15/18 704/219 |
| 2006/0149558 A1 | * | 7/2006 | Kahn | G10L 15/063 704/278 |

(Continued)

FOREIGN PATENT DOCUMENTS

JP     2015-219480    12/2015

OTHER PUBLICATIONS

International Search Report in PCT Application No. PCT/US2016/063351, dated Mar. 9, 2017 (3 pages).

(Continued)

*Primary Examiner* — Douglas Godbold
(74) *Attorney, Agent, or Firm* — Barnes & Thornburg LLP

(57) ABSTRACT

Technologies for detecting an end of a sentence in automatic speech recognition are disclosed. An automatic speech recognition device may acquire speech data, and identify phonemes and words of the speech data. The automatic speech recognition device may perform a syntactic parse based on the recognized words, and determine an end of a sentence based on the syntactic parse. For example, if the syntactic parse indicates that a certain set of consecutive recognized words form a syntactically complete and correct sentence, the automatic speech recognition device may determine that there is an end of a sentence at the end of that set of words.

25 Claims, 3 Drawing Sheets

(56) References Cited

U.S. PATENT DOCUMENTS

| | | | |
|---|---|---|---|
| 2008/0071520 A1* | 3/2008 | Sanford | G06F 17/271 |
| | | | 704/9 |
| 2008/0177542 A1 | 7/2008 | Yamamoto | |
| 2010/0145699 A1 | 6/2010 | Tian | |
| 2014/0244258 A1 | 8/2014 | Song et al. | |
| 2015/0248397 A1 | 9/2015 | Burstein et al. | |
| 2016/0104484 A1* | 4/2016 | Chakladar | G10L 15/22 |
| | | | 704/235 |
| 2016/0275942 A1* | 9/2016 | Drewes | G10L 15/063 |

OTHER PUBLICATIONS

Written Opinion in PCT Application No. PCT/US2016/063351, dated Mar. 9, 2017 (7 pages).

* cited by examiner

TECHNOLOGIES FOR END-OF-SENTENCE DETECTION USING SYNTACTIC COHERENCE

BACKGROUND

Despite the computational ability of modern compute devices, certain tasks such as speech detection and recognition remain challenging. There has been significant progress with word recognition using phoneme recognition, hidden Markov models, deep learning, and similar techniques. Such techniques are particularly effective for recognizing words and short statements.

One aspect of speech recognition that remains challenging for compute devices is determining the boundaries between sentences. One approach is to end a sentence whenever there is a pause or silence, but such approaches will not recognize a boundary between sentences that are not separated by a silence, and will add a boundary if there is a pause that is not between sentences, both of which are common in naturally-spoken sentences.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
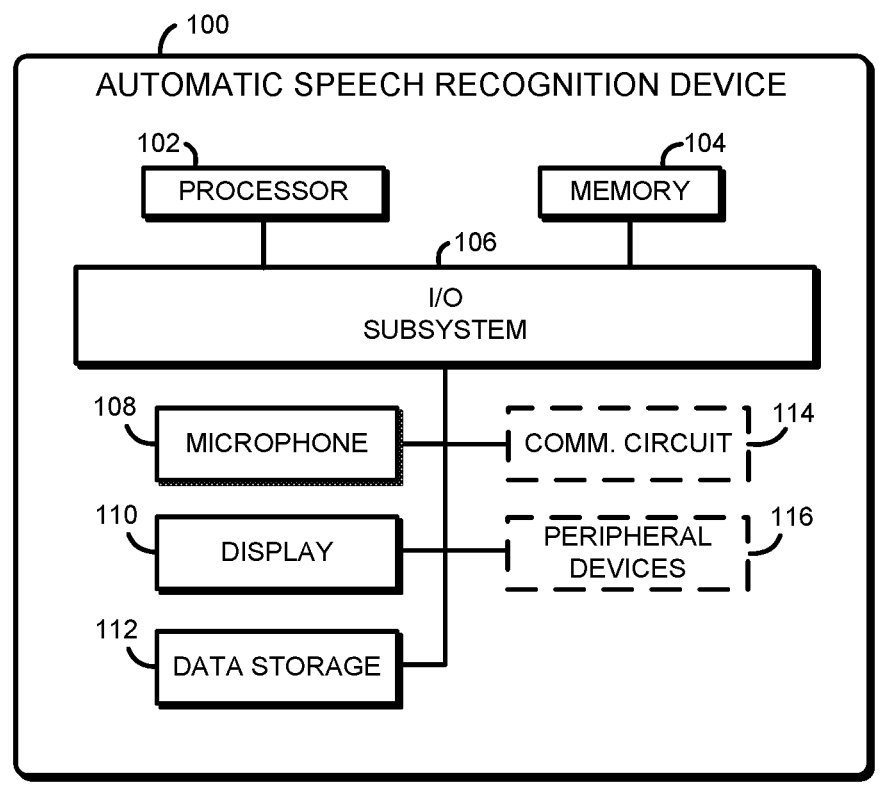
FIG. 1 is a simplified block diagram of at least one embodiment of an automatic speech recognition device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative automatic speech recognition device 100 includes a processor 102, a memory 104, an input/output (I/O) subsystem 106, a microphone 108, a display 110, and data storage 112. In some embodiments, one or more of the illustrative components of the automatic speech recognition device 100 may be incorporated in, or otherwise form a portion of, another component. For example, the memory 104, or portions thereof, may be incorporated in the processor 102 in some embodiments.

In the illustrative embodiment, in use and as described in more detail below, the automatic speech recognition device 100 captures speech data from a user of the automatic speech recognition device 100 using the microphone 108. The automatic speech recognition device 100 recognizes phonemes of the captured speech data, and recognizes words based on the phonemes. The automatic speech recognition device 100 then performs a syntactic parse on the recognized words. Based on the syntactic parse, the automatic speech recognition device 100 may determine an end-of-sentence of the speech data.

The automatic speech recognition device 100 may be embodied as any type of compute device capable of performing the functions described herein. For example, the automatic speech recognition device 100 may be embodied as or otherwise be included in, without limitation, a smartphone, a cellular phone, an embedded computing system, a System-on-a-Chip (SoC), a desktop computer, a server computer, a tablet computer, a notebook computer, a laptop computer, a wearable computer, a handset, a messaging device, a camera device, a multiprocessor system, a processor-based system, a consumer electronic device, and/or any other computing device.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the automatic speech recognition device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the automatic speech recognition device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the automatic speech recognition device 100 on a single integrated circuit chip.

The microphone 108 may be embodied as any type of device capable of converting sound into an electrical signal. To do so, the microphone 108 may utilize any type of suitable sound capture technology including, but not limited to electromagnetic induction, capacitance change, and/or piezoelectricity.

The display 110 may be embodied as any type of display on which information may be displayed to a user of the automatic speech recognition device 100, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

The data storage 112 may be embodied as any type of device or devices configured for the short-term or long-term storage of data. For example, the data storage 112 may include any one or more memory devices and circuits, memory cards, hard disk drives, solid-state drives, or other data storage devices.

Of course, in some embodiments, the automatic speech recognition device 100 may include other or additional components, such as those commonly found in a compute device. For example, the automatic speech recognition device 100 may also have a communication circuit 114 and/or peripheral devices 116 such as a keyboard, mouse, camera, speaker, etc.

The communication circuit 114 may be embodied as any type of communication circuit, device, or collection thereof, capable of enabling communications between the automatic speech recognition device 100 and other devices. To do so, the communication circuit 114 may be configured to use any one or more communication technology and associated protocols (e.g., Ethernet, Bluetooth®, Wi-Fi®, WiMAX, near field communication (NFC), etc.) to effect such communication.

Figure 2:
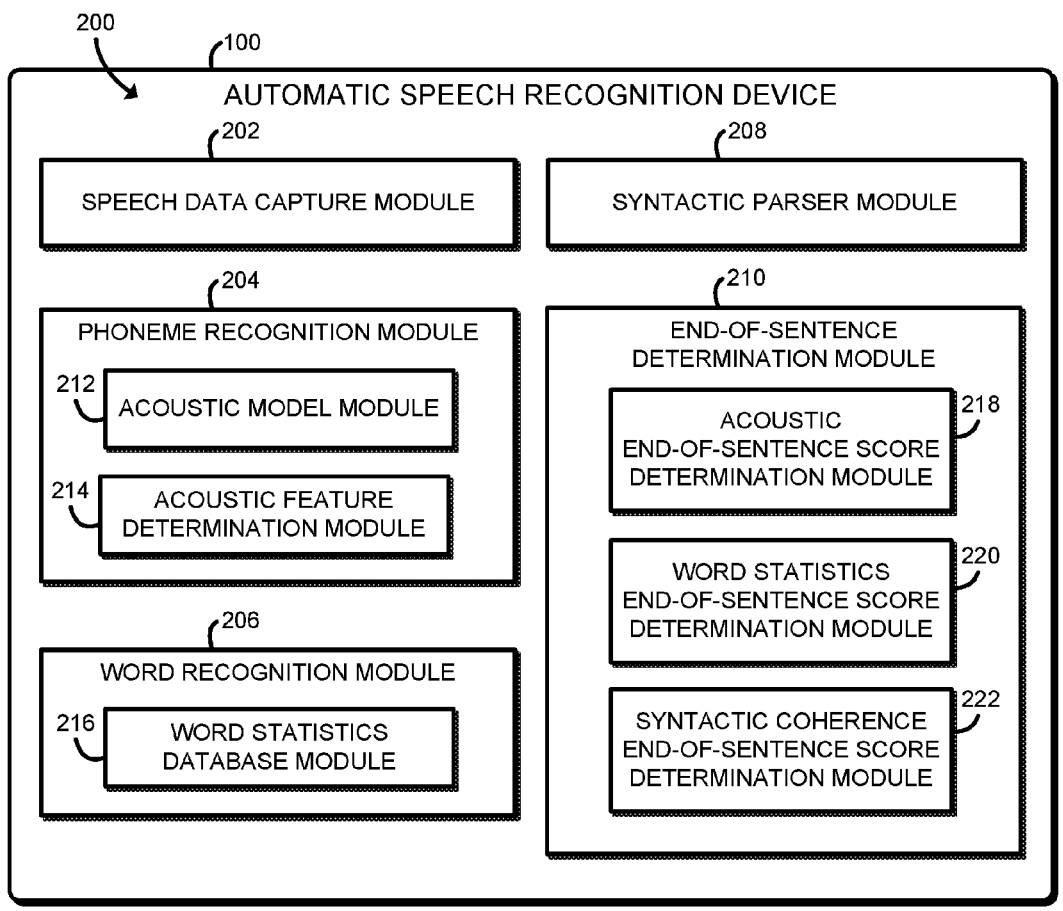
FIG. 2 is a block diagram of at least one embodiment of an environment that may be established by the automatic speech recognition device of FIG. 1.

Referring now to FIG. 2, in use, the automatic speech recognition device 100 may establish an environment 200. The illustrative environment 200 includes a speech data capture module 202, a phoneme recognition module 204, a word recognition module 206, a syntactic parser module 208, and an end-of-sentence determination module 210. The various modules of the environment 200 may be embodied as hardware, software, firmware, or a combination thereof. For example, the various modules, logic, and other components of the environment 200 may form a portion of, or otherwise be established by, the processor 102 or other hardware components of the automatic speech recognition device 100. As such, in some embodiments, one or more of the modules of the environment 200 may be embodied as circuitry or collection of electrical devices (e.g., a speech data capture circuit 202, a phoneme recognition circuit 204, a word recognition circuit 206, etc.). It should be appreciated that, in such embodiments, one or more of the circuits (e.g., the speech data capture circuit 202, the phoneme recognition circuit 204, the word recognition circuit 206, etc.) may form a portion of one or more of the processor 102, the memory 104, the I/O subsystem 106, and/or the data storage 112. Additionally, in some embodiments, one or more of the illustrative modules may form a portion of another module and/or one or more of the illustrative modules may be independent of one another.

The speech data capture module 202 is configured to capture or otherwise acquire speech data. In the illustrative embodiment, the speech data capture module 202 captures speech data from the microphone 108. Additionally or alternatively, the speech data capture module 202 may acquire speech data that has been previously captured from the microphone 108 or from a microphone of a different compute device, such as by accessing data storage 112 or by receiving the speech data from the communication circuit 114.

The phoneme recognition module 204 is configured to recognize phonemes from the speech data. The phoneme recognition module 204 may use the acoustic model module 212 to represent the relationship between an audio signal (such as the speech data) and the phonemes and to recognize the string of phonemes present in the speech signal. The phoneme recognition module 204 may use any technique or combination of techniques to recognize phonemes, such as an n-gram model, a hidden Markov model, a neural network including a deep neural network, a support vector machine, a conditional random field, or the like. In some embodiments, the phoneme recognition module 204 may treat silence (or similar indication of a lack of a phoneme) as its own phoneme, or may otherwise consider or classify silence. The phoneme recognition module 204 also includes an acoustic feature determination module 214, which is configured to determine one or more acoustic features of the speech data such as a frequency, a pitch, a rate of change of the pitch, an energy, a rate of change of the energy, and so forth.

The word recognition module 206 is configured to recognize words from the speech data based on the recognized phonemes. The word recognition module 206 may make use of a word statistics database module 216, which may contain statistics related to how frequently different sequences of words appear in certain contexts, including how frequently the sequences appear at the end of a sentence. The word recognition module 206 may use any technique or combination of techniques to recognize words, such as an n-gram model, a hidden Markov model, a neural network including a deep neural network, a support vector machine, a conditional random field, or the like. In some embodiments, the word recognition module 206 may be configured to recognize words without explicitly making use of previously-recognized phonemes.

The syntactic parser module 208 is configured to perform a syntactic parse based on the recognized words using any parsing technique, such as by producing a syntactic parse tree of the recognized words. The syntactic parser module may use any type or combination of types of parse trees, such as constituency-based parse trees, dependency-based parse trees, and/or phrase markers.

The end-of-sentence determination module 210 is configured to determine if there is an end of a sentence in the speech data at a specific time of the speech data, such as after each recognized phoneme or after each recognized word. To do this, the end-of-sentence determination module is configured to consider each of the scores determined by an acoustic end-of-sentence score determination module 218, a word statistics end-of-sentence score determination module 220, and a syntactic coherence end-of-sentence score determination module 222. The score of each of the modules 218, 220, 222 may be embodied as a simple number, such as a number between 0 and 1 indicating the particular phoneme is an end of a sentence, or the score may be more complex, and may include additional numbers such as various confidence levels. The end-of-sentence determination module 210 may determine an end of sentence based on a relatively simple approach such as adding the scores together or averaging them, or may use a more complex approach such as using machine learning techniques or algorithms, such as a neural network including a deep neural network, a support vector machine, a conditional random field, or the like.

The acoustic end-of-sentence score determination module 218 is configured to determine an acoustic end-of-sentence score indicating the likelihood of an end of a sentence after a recognized phoneme based on the recognized phonemes (including silence) and the determined acoustic features. For example, the acoustic end-of-sentence score determination module 218 may determine an acoustic end-of-sentence score indicating a high likelihood of an end of a sentence based on a long silence, or may determine an acoustic end-of-sentence score indicating a low likelihood of an end of a sentence based on a short silence or no silence. As another example, the acoustic end-of-sentence score determination module 218 may determine an acoustic end-of-sentence score indicating a high likelihood of an end of a sentence based on a high value of pitch derivative, which may be an indication of an end of an interrogative sentence.

The word statistics end-of-sentence score determination module 220 is configured to determine a word statistics end-of-sentence score indicating the likelihood of an end of a sentence after a recognized word based on the recognized words and the word statistics. The word statistics end-of-sentence score determination module 220 may consider the likelihood a sentence ends with the last word or words recognized. For example, the word statistics end-of-sentence score determination module 220 may determine, based on the word statistics, that an end of sentence is unlikely if the last recognized word was the word "the."

The syntactic coherence end-of-sentence score determination module 222 is configured to determine a syntactic coherence end-of-sentence score indicating the likelihood of an end of a sentence after a recognized word based on the coherence of the parsing of the words. For example, if the syntactic parse of the words indicates that there is a missing element such as a verb, the coherence would be low, and the syntactic coherence end-of-sentence score may then indicate a low likelihood of an end of a sentence. If the syntactic parse of the words indicates that the words form a syntactically correct and complete sentence, the coherence would be high, and the syntactic coherence end-of-sentence score may then indicate a high probability of an end of a sentence. In the illustrative embodiment, the determination is based on the syntactic parse tree, and in particular based on the syntactic coherence of the syntactic parse tree. The syntactic coherence end-of-sentence score determination module 222 may determine a syntactic coherence end-of-sentence score using rules that may be hand-crafted or otherwise determined by one or more natural persons. Additionally or alternatively, the syntactic coherence end-of-sentence score determination module 222 may determine a syntactic coherence end-of-sentence score based on one or more techniques or algorithms based on machine learning, such as a neural network including a deep neural network, a support vector machine, a conditional random field, or the like.

Figure 3:
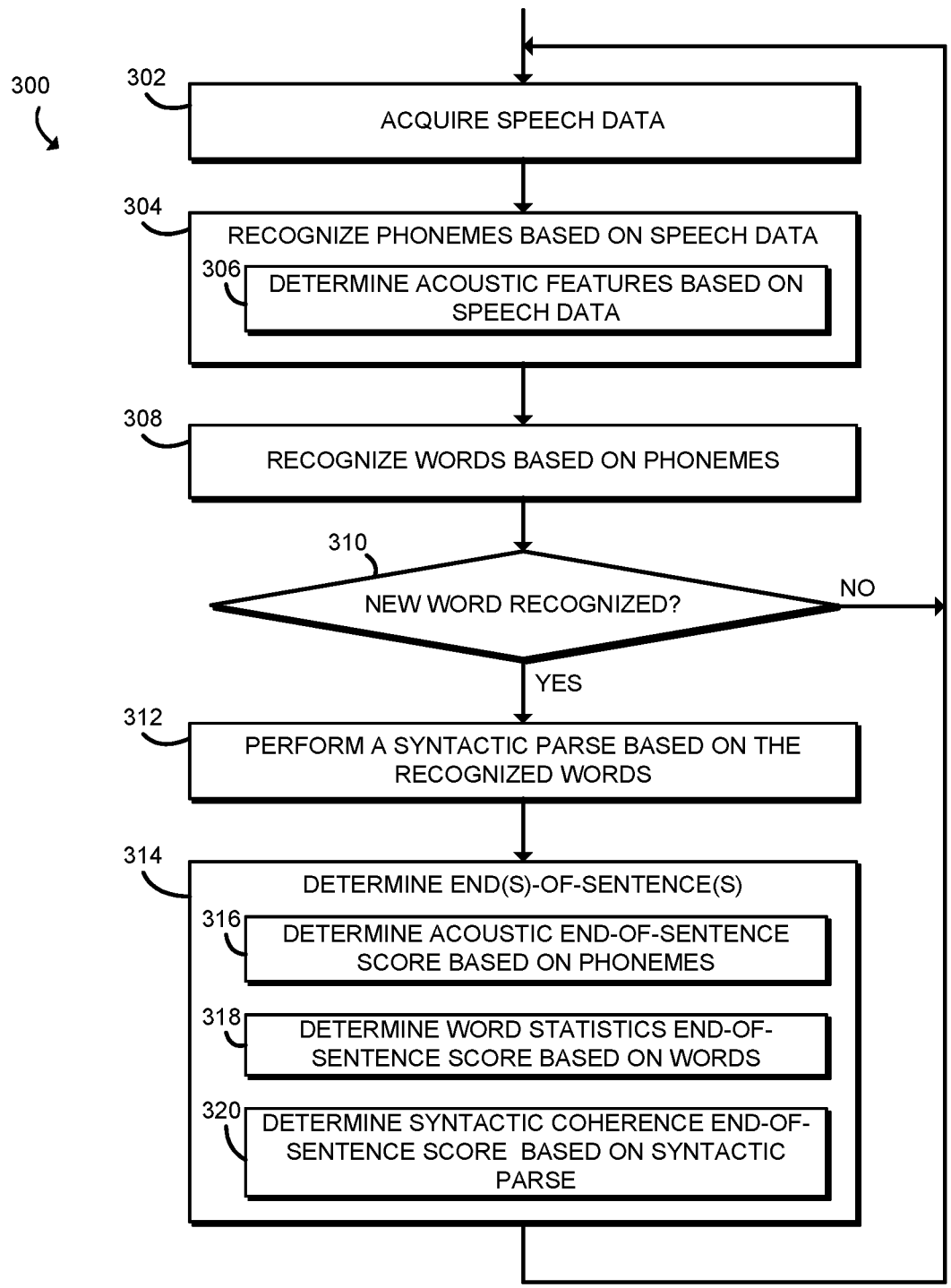
FIG. 3 is a simplified flow diagram of at least one embodiment of a method for speech recognition that may be executed by the speech recognition device of FIG. 1.

Referring now to FIG. 3, in use, the automatic speech recognition device 100 may execute a method 300 for determining an end of a sentence. The method 300 begins with block 302, in which the automatic speech recognition device 100 acquires speech data. As described above, in the illustrative embodiment, the speech data is captured from the microphone 108. In other embodiments, the speech data may be acquired from sources that previously captured the speech data from a microphone, such as from the data storage 112 or from the communication circuit 114.

In block 304, the automatic speech recognition device 100 recognizes the phonemes based on the speech data using the acoustic model and one or more of the techniques described above, such as an n-gram model or a neural network. In the illustrative embodiment, the automatic speech recognition device 100 also determines one or more acoustic features based on the speech data in block 306. In some embodiments, the automatic speech recognition device 100 may recognize phonemes for all available speech data. In other embodiments, the automatic speech recognition device 100 may only recognize phonemes from a portion of the speech data, such as speech data acquired since phonemes were last recognized, or from speech data associated with the previous several seconds. In some cases, the automatic speech recognition device 100 may revise the recognition of phonemes previously recognized based on various factors such as additional speech data not available for the initial recognition.

In block 308, the automatic speech recognition device 100 recognizes the words based on the phonemes using one or more of the techniques described above, such as an n-gram model or a neural network. As part of recognizing the words, the automatic speech recognition device 100 may access the word statistics database module 216. In some embodiments, the automatic speech recognition device 100 may recognize words for all available speech data. In other embodiments, the automatic speech recognition device 100 may only recognize words from a portion of the speech data, such as from phonemes recognized since the last recognized word, or from speech data associated with the previous several seconds. In some cases, the automatic speech recognition device 100 may revise the recognition of words previously recognized based on various factors such as additional speech data not available for the initial recognition. Of course, in some cases, the automatic speech recognition device 100 may determine that no new words have been recognized since the preceding time block 308 was executed.

In block 310, the automatic speech recognition device 100 proceeds to block 312 if a new word is recognized, and returns to block 302 if no new word is recognized in which the automatic speech recognition device 100 acquires additional speech data. In block 312, the automatic speech recognition device 100 performs a syntactic parse based on the recognized words to determine a syntactic coherence of the speech data. To do so, the automatic speech recognition device 100 may utilize any suitable parsing technique, such as by producing a syntactic parse tree. In some embodiments, the automatic speech recognition device 100 may perform a syntactic parse on every possible set of consecutive recognized words starting from a beginning word up until the most recently recognized word. The beginning word may be selected such that a certain number of words or sentences are included. By determining the syntactic coherence of the speech data, the automatic speech recognition device 100 analyzes the syntactic "correctness" of the recognized words to better identify the end of a sentence (e.g., whether the set of words would logically form an end of sentence).

In block 314, the automatic speech recognition device 100 determines one or more ends-of-sentences. As part of this task, the speech recognition device 100 determines an acoustic end-of-sentence score, a word statistics end-of-sentence score, and a syntactic coherence end-of-sentence score, each of which is described in more detail below. Each of the scores indicates a likelihood of an end of a sentence after a recognized word. As described above, the automatic speech recognition device 100 may use a relatively simple approach to determining the end-of-sentence score such as adding the scores together or averaging them, or may use a more complex approach such as using machine learning techniques or algorithms, such as a neural network including a deep neural network, a support vector machine, a conditional random field, or the like. In some embodiments, the automatic speech recognition device 100 may not determine or use each of the scores described above, but may only use, e.g., any combination of one or two of them, such as only the syntactic coherence end-of-sentence score. In the illustrative embodiment, the automatic speech recognition device 100 determines whether there is an end of a sentence after each recognized word starting from the same beginning word as in block 312 up until the most recently recognized word. In other embodiments, the automatic speech recognition device 100 may determine whether there is an end of a sentence after more words, fewer words, or otherwise a different set of words. In some cases, the automatic speech recognition device 100 may revise the determination of an end of a sentence previously determined based on various factors such as additional speech data not available for the initial recognition.

In block 316, the automatic speech recognition device 100 determines the acoustic end-of-sentence score based on the recognized phonemes and the determined acoustic features. As stated above, the automatic speech recognition device 100 may determine the acoustic end-of-sentence score indicating a high likelihood of an end of a sentence based on a long silence, or may determine an acoustic end-of-sentence score indicating a low likelihood of an end of a sentence based on a short silence or no silence.

In block 318, the automatic speech recognition device 100 determines the word statistics end-of-sentence score based on the recognized words and the word statistics indicated by the word statistics database module 216 (such as how frequently different sequences of words appear at the end of a sentence).

In block 320, the automatic speech recognition device 100 determines the syntactic coherence end-of-sentence score based on the coherence of the syntactic parse of the recognized words. In the illustrative embodiment, the determination is based on the syntactic parse tree, and in particular based on the syntactic coherence of the syntactic parse tree. As described above, the automatic speech recognition device 100 may use a rule-based technique or algorithm and/or machine-learning-based techniques or algorithms to determine the syntactic coherence of the syntactic parse. In some embodiments using a rule-based technique or algorithm, the rules may be determined by one or more natural persons.

After the end-of-sentence(s) have been determined in block 314, the method 300 loops back to block 302 in which the automatic speech recognition device 100 acquires additional speed data. Of course, in some embodiments, the automatic speed recognition device 100 may also perform additional functions based on a determined end-of-sentence, such as performing a function based on the identified sentence, punctuating automated text, and/or other functions. Such additional functions may be performed contemporaneously with the continued execution of the method 300.

EXAMPLES

Illustrative examples of the devices, systems, and methods disclosed herein are provided below. An embodiment of the devices, systems, and methods may include any one or more, and any combination of, the examples described below.

Example 1 includes an automatic speech recognition device for determining an end of a sentence of speech data, the automatic speech recognition device comprising a speech data capture module to acquire speech data; a phoneme recognition module to recognize, based on the speech data, phonemes of the speech data; a word recognition module to recognize, based on the phonemes, words of the speech data; a syntactic parser module to parse, based on the words, the speech data to determine a syntactic coherence of the speech data; and an end-of-sentence determination module to determine, based on the syntactic coherence, the end of the sentence.

Example 2 includes the subject matter of Example 1, and wherein to determine, based on the syntactic coherence, the end of the sentence comprises to determine, based on the syntactic coherence, the end of the sentence using a machine-learning-based algorithm.

Example 3 includes the subject matter of any of Examples 1 and 2, and wherein to determine, based on the syntactic coherence, the end of the sentence comprises to determine, based on the syntactic coherence, the end of the sentence using a rule-based algorithm.

Example 4 includes the subject matter of any of Examples 1-3, and wherein the end-of-sentence determination module is further to determine, based on the syntactic parse, a syntactic coherence end-of-sentence score, determine, based on the phonemes, an acoustic end-of-sentence score, and determine, based on the words, a word statistics end-of-sentence score, wherein to determine the end of the sentence comprises to determine the end of the sentence based on the syntactic coherence end-of-sentence score, the acoustic end-of-sentence score, and the word statistics end-of-sentence score.

Example 5 includes the subject matter of any of Examples 1-4, and wherein to determine, based on the phonemes, the acoustic end-of-sentence score comprises to determine, based on a silence of the speech data, the acoustic end-of-sentence score.

Example 6 includes the subject matter of any of Examples 1-5, and wherein to determine the end of the sentence based on the syntactic coherence end-of-sentence score, the acoustic end-of-sentence score, and the word statistics end-of-sentence score comprises to determine the end of the sentence based on the syntactic coherence end-of-sentence score, the acoustic end-of-sentence score, and the word statistics end-of-sentence score using a machine-learning-based algorithm.

Example 7 includes the subject matter of any of Examples 1-6, and wherein to determine the end of the sentence based on the syntactic coherence end-of-sentence score, the acoustic end-of-sentence score, and the word statistics end-of-sentence score comprises to determine the end of the sentence based on the syntactic coherence end-of-sentence score, the acoustic end-of-sentence score, and the word statistics end-of-sentence score using a rule-based algorithm.

Example 8 includes the subject matter of any of Examples 1-7, and wherein the end-of-sentence determination module is further to determine, based on the syntactic parse, a syntactic coherence end-of-sentence score, and determine, based on the acoustic features, an acoustic end-of-sentence score, wherein to determine the end of the sentence comprises to determine the end of the sentence based on the syntactic coherence end-of-sentence score and the acoustic end-of-sentence score.

Example 9 includes the subject matter of any of Examples 1-8, and wherein the acoustic features comprise at least one of a frequency, a pitch, a rate of change of the pitch, an energy, or a rate of change of the energy.

Example 10 includes the subject matter of any of Examples 1-9, and further including a microphone, wherein to acquire speech data comprises to capture speech data from the microphone.

Example 11 includes the subject matter of any of Examples 1-10, and further including a data storage, wherein to acquire speech data comprises to access the speech data from the data storage.

Example 12 includes the subject matter of any of Examples 1-11, and further including a communication module, wherein to acquire speech data comprises to receive speech data using the communication module.

Example 13 includes a method for determining an end of a sentence of speech data by an automatic speech recognition device, the method comprising acquiring, by the automatic speech recognition device, the speech data; recognizing, by the automatic speech recognition device and based on the speech data, phonemes of the speech data; recognizing, by the automatic speech recognition device and based on the phonemes, words of the speech data; parsing, by the automatic speech recognition device and based on the words, the speech data to determine a syntactic coherence of the speech data; and determining, by the automatic speech recognition device and based on the syntactic coherence, the end of the sentence.

Example 14 includes the subject matter of Example 13, and wherein determining the end of the sentence based on the syntactic coherence comprises determining the end of the sentence based on the syntactic coherence using a machine-learning-based algorithm.

Example 15 includes the subject matter of any of Examples 13 and 14, and wherein determining the end of the sentence based on the syntactic coherence comprises determining the end of the sentence based on the syntactic coherence using a rule-based algorithm.

Example 16 includes the subject matter of any of Examples 13-15, and further including determining, by the automatic speech recognition device, a syntactic coherence end-of-sentence score based on the syntactic parse, determining, by the automatic speech recognition device, an acoustic end-of-sentence score based on the phonemes, and determining, by the automatic speech recognition device, a word statistics end-of-sentence score based on the words, wherein determining the end of the sentence comprises determining the end of the sentence based on the syntactic coherence end-of-sentence score, the acoustic end-of-sentence score, and the word statistics end-of-sentence score.

Example 17 includes the subject matter of any of Examples 13-16, and wherein determining the acoustic end-of-sentence score based on the phonemes comprises determining the acoustic end-of-sentence score based on a silence of the speech data.

Example 18 includes the subject matter of any of Examples 13-17, and wherein determining the end of the sentence based on the syntactic coherence end-of-sentence score, the acoustic end-of-sentence score, and the word statistics end-of-sentence score comprises determining the end of the sentence based on the syntactic coherence end-of-sentence score, the acoustic end-of-sentence score, and the word statistics end-of-sentence score using a machine-learning-based algorithm.

Example 19 includes the subject matter of any of Examples 13-18, and wherein determining the end of the sentence based on the syntactic coherence end-of-sentence score, the acoustic end-of-sentence score, and the word statistics end-of-sentence score comprises determining the end of the sentence based on the syntactic coherence end-of-sentence score, the acoustic end-of-sentence score, and the word statistics end-of-sentence score using a rule-based algorithm.

Example 20 includes the subject matter of any of Examples 13-19, and further including determining, based on the syntactic parse, a syntactic coherence end-of-sentence score, and determining, based on the acoustic features, an acoustic end-of-sentence score, wherein determining the end of the sentence comprises determining the end of the sentence based on the syntactic coherence end-of-sentence score and the acoustic end-of-sentence score.

Example 21 includes the subject matter of any of Examples 13-20, and wherein the acoustic features comprise at least one of a frequency, a pitch, a rate of change of the pitch, an energy, or a rate of change of the energy.

Example 22 includes the subject matter of any of Examples 13-21, and wherein acquiring the speech data comprises capturing the speech data from a microphone of the automatic speech recognition device.

Example 23 includes the subject matter of any of Examples 13-22, and wherein acquiring the speech data comprises accessing the speech data from data storage of the automatic speech recognition device.

Example 24 includes the subject matter of any of Examples 13-23, and wherein acquiring the speech data comprises receiving the speech data by the automatic speech recognition device and from a device different from the automatic speech recognition device.

Example 25 includes one or more machine-readable storage media comprising a plurality of instructions stored thereon that in response to being executed result in a compute device performing the method of any of Examples 13-24.

Example 26 includes an automatic speech recognition device for determining an end of a sentence of speech data, the automatic speech recognition device comprising means for acquiring the speech data; means for recognizing, based on the speech data, phonemes of the speech data; means for recognizing, based on the phonemes, words of the speech data; means for parsing, based on the words, the speech data to determine a syntactic coherence of the speech data; and means for determining, based on the syntactic coherence, the end of the sentence.

Example 27 includes the subject matter of Example 26, and wherein the means for determining the end of the sentence based on the syntactic coherence comprises means for determining the end of the sentence based on the syntactic coherence using a machine-learning-based algorithm.

Example 28 includes the subject matter of any of Examples 26 and 27, and wherein the means for determining the end of the sentence based on the syntactic coherence comprises means for determining the end of the sentence based on the syntactic coherence using a rule-based algorithm.

Example 29 includes the subject matter of any of Examples 26-28, and further including means for determining a syntactic coherence end-of-sentence score based on the syntactic parse, means for determining an acoustic end-of-sentence score based on the phonemes, and means for determining a word statistics end-of-sentence score based on the words, wherein the means for determining the end of the sentence comprises means for determining the end of the sentence based on the syntactic coherence end-of-sentence score, the acoustic end-of-sentence score, and the word statistics end-of-sentence score.

Example 30 includes the subject matter of any of Examples 26-29, and wherein means for determining the acoustic end-of-sentence score based on the phonemes comprises means for determining the acoustic end-of-sentence score based on a silence of the speech data.

Example 31 includes the subject matter of any of Examples 26-30, and wherein means for determining the end of the sentence based on the syntactic coherence end-of-sentence score, the acoustic end-of-sentence score, and the word statistics end-of-sentence score comprises means for determining the end of the sentence based on the syntactic coherence end-of-sentence score, the acoustic end-of-sentence score, and the word statistics end-of-sentence score using a machine-learning-based algorithm.

Example 32 includes the subject matter of any of Examples 26-31, and wherein means for determining the end of the sentence based on the syntactic coherence end-of-sentence score, the acoustic end-of-sentence score, and the word statistics end-of-sentence score comprises means for determining the end of the sentence based on the syntactic coherence end-of-sentence score, the acoustic end-of-sentence score, and the word statistics end-of-sentence score using a rule-based algorithm.

Example 33 includes the subject matter of any of Examples 26-32, and further including means for determining, based on the syntactic parse, a syntactic coherence end-of-sentence score, and means for determining, based on the acoustic features, an acoustic end-of-sentence score, wherein means for determining the end of the sentence comprises means for determining the end of the sentence based on the syntactic coherence end-of-sentence score and the acoustic end-of-sentence score.

Example 34 includes the subject matter of any of Examples 26-33, and wherein the acoustic features comprise at least one of a frequency, a pitch, a rate of change of the pitch, an energy, or a rate of change of the energy.

Example 35 includes the subject matter of any of Examples 26-34, and wherein means for acquiring the speech data comprises means for capturing the speech data from a microphone of the automatic speech recognition device.

Example 36 includes the subject matter of any of Examples 26-35, and wherein means for acquiring the speech data comprises means for accessing the speech data from data storage of the automatic speech recognition device.

Example 37 includes the subject matter of any of Examples 26-36, and wherein means for acquiring the speech data comprises means for receiving the speech data by the automatic speech recognition device and from a device different from the automatic speech recognition device.

The invention claimed is:

1. An automatic speech recognition device comprising:
   a speech data capture module to acquire speech data;
   a phoneme recognition module to recognize, based on the speech data, phonemes of the speech data;
   a word recognition module to recognize, based on the phonemes, words of the speech data;
   a syntactic parser module to parse, based on the words, the speech data to determine a syntactic coherence of the speech data; and
   an end-of-sentence determination module to:
      determine, based on the words, a word statistics end-of-sentence score;
      determine, based on the syntactic coherence and the word statistics end-of-sentence score, an end of a sentence of the speech data; and
      determine, based on the determined end of the sentence, a speech recognition result.

2. The automatic speech recognition device of claim 1, wherein to determine, based on the syntactic coherence, the end of the sentence comprises to determine, based on the syntactic coherence, the end of the sentence using a machine-learning-based algorithm.

3. The automatic speech recognition device of claim 1, wherein to determine, based on the syntactic coherence, the end of the sentence comprises to determine, based on the syntactic coherence, the end of the sentence using a rule-based algorithm.

4. The automatic speech recognition device of claim 1, wherein the end-of-sentence determination module is further to:
   determine, based on the syntactic parse, a syntactic coherence end-of-sentence score, and
   determine, based on the phonemes, an acoustic end-of-sentence score,
   wherein to determine the end of the sentence comprises to determine the end of the sentence based on the syntactic coherence end-of-sentence score and the acoustic end-of-sentence score.

5. The automatic speech recognition device of claim 4, wherein to determine, based on the phonemes, the acoustic end-of-sentence score comprises to determine, based on a silence of the speech data, the acoustic end-of-sentence score.

6. The automatic speech recognition device of claim 4, wherein to determine the end of the sentence based on the syntactic coherence end-of-sentence score, the acoustic end-of-sentence score, and the word statistics end-of-sentence score comprises to determine the end of the sentence based on the syntactic coherence end-of-sentence score, the acoustic end-of-sentence score, and the word statistics end-of-sentence score using a machine-learning-based algorithm.

7. The automatic speech recognition device of claim 4, wherein to determine the end of the sentence based on the syntactic coherence end-of-sentence score, the acoustic end-of-sentence score, and the word statistics end-of-sentence score comprises to determine the end of the sentence based on the syntactic coherence end-of-sentence score, the acoustic end-of-sentence score, and the word statistics end-of-sentence score using a rule-based algorithm.

8. The automatic speech recognition device of claim 1, wherein the end-of-sentence determination module is further to:
   determine, based on the syntactic parse, a syntactic coherence end-of-sentence score, and
   determine, based on the acoustic features, an acoustic end-of-sentence score,
   wherein to determine the end of the sentence comprises to determine the end of the sentence based on the syntactic coherence end-of-sentence score and the acoustic end-of-sentence score.

9. The automatic speech recognition device of claim 8, wherein the acoustic features comprise at least one of a frequency, a pitch, a rate of change of the pitch, an energy associated with one or more non-silent phonemes, or a rate of change of the energy.

10. One or more non-transitory, machine-readable storage media comprising a plurality of instructions stored thereon that, when executed, cause an automatic speech recognition device to:
   acquire speech data;
   recognize, based on the speech data, phonemes of the speech data;
   recognize, based on the phonemes, words of the speech data;
   parse, based on the words, the speech data to determine a syntactic coherence of the speech data;
   determine, based on the words, a word statistics end-of-sentence score;
   determine, based on the syntactic coherence and the word statistics end-of-sentence score, an end of a sentence of the speech data; and
   determine, based on the determined end of the sentence, a speech recognition result.

11. The one or more non-transitory, machine-readable storage media of claim 10, wherein to determine, based on the syntactic coherence, the end of the sentence comprises to determine, based on the syntactic coherence, the end of the sentence using a machine-learning-based algorithm.

12. The one or more non-transitory, machine-readable storage media of claim 10, wherein to determine, based on the syntactic coherence, the end of the sentence comprises to determine, based on the syntactic coherence, the end of the sentence using a rule-based algorithm.

13. The one or more non-transitory, machine-readable storage media of claim 10, wherein the plurality of instructions further cause the automatic speech recognition device to:
   determine, based on the syntactic parse, a syntactic coherence end-of-sentence score, and
   determine, based on the phonemes, an acoustic end-of-sentence score,
   wherein to determine the end of the sentence comprises to determine the end of the sentence based on the syntactic coherence end-of-sentence score and the acoustic end-of-sentence score.

14. The one or more non-transitory, machine-readable storage media of claim 13, wherein to determine, based on the phonemes, the acoustic end-of-sentence score comprises to determine, based on a silence of the speech data, the acoustic end-of-sentence score.

15. The one or more non-transitory, machine-readable storage media of claim 13, wherein to determine the end of the sentence based on the syntactic coherence end-of-sentence score, the acoustic end-of-sentence score, and the word statistics end-of-sentence score comprises to determine the end of the sentence based on the syntactic coherence end-of-sentence score, the acoustic end-of-sentence score, and the word statistics end-of-sentence score using a machine-learning-based algorithm.

16. The one or more non-transitory, machine-readable storage media of claim 10, wherein the plurality of instructions further cause the automatic speech recognition device to:
   determine, based on the syntactic parse, a syntactic coherence end-of-sentence score, and
   determine, based on the acoustic features, an acoustic end-of-sentence score,
   wherein to determine the end of the sentence comprises to determine the end of the sentence based on the syntactic coherence end-of-sentence score and the acoustic end-of-sentence score.

17. The one or more non-transitory, machine-readable storage media of claim 16, wherein the acoustic features comprise at least one of a frequency, a pitch, a rate of change of the pitch, an energy associated with one or more non-silent phonemes, or a rate of change of the energy.

18. A method for determining an end of a sentence of speech data, the method comprising:
   acquiring, by an automatic speech recognition device, speech data;
   recognizing, by the automatic speech recognition device and based on the speech data, phonemes of the speech data;
   recognizing, by the automatic speech recognition device and based on the phonemes, words of the speech data;
   parsing, by the automatic speech recognition device and based on the words, the speech data to determine a syntactic coherence of the speech data;
   determine, by the automatic speech recognition device and based on the words, a word statistics end-of-sentence score;
   determining, by the automatic speech recognition device and based on the syntactic coherence and the word statistics end-of-sentence score, an end of a sentence of the speech data;
   determining, by the automatic speech recognition device and based on the determined end of the sentence, a speech recognition result.

19. The method of claim 18, wherein determining the end of the sentence based on the syntactic coherence comprises determining the end of the sentence based on the syntactic coherence using a machine-learning-based algorithm.

20. The method of claim 18, wherein determining the end of the sentence based on the syntactic coherence comprises determining the end of the sentence based on the syntactic coherence using a rule-based algorithm.

21. The method of claim 18, further comprising:
   determining, by the automatic speech recognition device, a syntactic coherence end-of-sentence score based on the syntactic parse, and
   determining, by the automatic speech recognition device, an acoustic end-of-sentence score based on the phonemes,
   wherein determining the end of the sentence comprises determining the end of the sentence based on the syntactic coherence end-of-sentence score and the acoustic end-of-sentence score.

22. The method of claim 21, wherein determining the acoustic end-of-sentence score based on the phonemes comprises determining the acoustic end-of-sentence score based on a silence of the speech data.

23. The method of claim 21, wherein determining the end of the sentence based on the syntactic coherence end-of-sentence score, the acoustic end-of-sentence score, and the word statistics end-of-sentence score comprises determining the end of the sentence based on the syntactic coherence end-of-sentence score, the acoustic end-of-sentence score, and the word statistics end-of-sentence score using a machine-learning-based algorithm.

24. The method of claim 18, further comprising:
   determining, based on the syntactic parse, a syntactic coherence end-of-sentence score, and
   determining, based on the acoustic features, an acoustic end-of-sentence score,
   wherein determining the end of the sentence comprises determining the end of the sentence based on the syntactic coherence end-of-sentence score and the acoustic end-of-sentence score.

25. The method of claim 24, wherein the acoustic features comprise at least one of a frequency, a pitch, a rate of change of the pitch, an energy associated with one or more non-silent phonemes, or a rate of change of the energy.

\* \* \* \* \*